United States Patent [19]

Anderson

[11] Patent Number: 5,615,510
[45] Date of Patent: Apr. 1, 1997

[54] SEINE

[76] Inventor: Eric C. Anderson, 3610 E. Baxter La., Bozeman, Mont. 59715

[21] Appl. No.: 368,554

[22] Filed: Jan. 4, 1995

[51] Int. Cl.$^6$ ................................................. A01K 73/12
[52] U.S. Cl. ............................................. 43/14; 43/12
[58] Field of Search ......................... 43/14, 11, 12, 43/105

[56]           References Cited

U.S. PATENT DOCUMENTS

| | | | |
|---|---|---|---|
| 97,420 | 11/1869 | Mayhew | 37/316 |
| 284,156 | 8/1883 | Woodruff | 37/316 |
| 1,014,250 | 1/1912 | Norman | 56/400.11 |
| 1,143,759 | 6/1915 | Franklin | 43/12 |
| 2,653,403 | 9/1953 | Oslund | 43/11 |
| 2,669,798 | 2/1954 | Hesch | 43/8 |
| 3,394,483 | 7/1968 | Taglioli | 43/11 |
| 4,653,214 | 3/1987 | Cline | 43/14 |
| 4,745,703 | 5/1988 | Walter | 43/14 |

*Primary Examiner*—Jeanne M. Elpel
*Attorney, Agent, or Firm*—Merchant, Gould, Smith, Edell, Welter & Schmidt, P.A.

[57]           ABSTRACT

A seine for collecting bait from a body of water having a bed. The seine comprises a mesh receptacle having an intake portion and a collection portion. A frame is operably connected to the mesh receptacle and has a first portion for holding the intake portion of the mesh receptacle in a receiving state and a second portion for holding the collection portion of the mesh receptacle in a receiving state. An anchor is operably connected to the frame and has a prong capable of penetrating into the bed of the body of water thereby securing the seine to the bed. A handle is operably connected to the frame.

9 Claims, 1 Drawing Sheet

5,615,510

SEINE

FIELD OF THE INVENTION

This invention generally relates to fishing seines, and more particularly to a seine that is readily manipulated and operated by one person.

BACKGROUND

Seines are often used to catch aquatic wild life such as crayfish, bullheads, minnows, hellgrammites, crustacea, and other live baits. There are several types of seines that are currently used. For example, one type of seine has two handles, one on either side of the net. The seine requires two people to operate. Each person grabs a handle and then drag the seine through the water.

Another type of seine is disclosed in the U.S. Pat. No. 2,653,403, which discloses a net for scooping up fish. The net has jaws with teeth at the open end. The jaws clamp down on any fish that enters the net in order to prevent escape. This type of seine has a disadvantage because the person must first find a fish and then try to scoop it up. This task is difficult given the quickness of fish in their natural habitat. The net is also limited because it can only catch one, or a small number, of fish at any one time.

U.S. Pat. No. 2,669,798 to Hesch discloses a seine that requires a person to dig the bottom edge of the seine into a stream bed. The user then has to pull the seine through the water so that the bottom edge drags along the bed.

A purse-type seine is disclosed in U.S. Pat. No. 4,653,214. The device in this patent is similar to a large, rectangular fish net. In operation, the user places the net in front of him/her and pushes the net through the water.

A common problem with the seines described above is that dragging or pushing them against the water current requires a great deal of strength and is especially difficult if the current is strong. Additionally, fish and other aquatic wildlife are easily startled by noise and the presence of people in the water. Thus, the aquatic wildlife will be scared away from the seine while people are moving it through the water.

Another common problem with the current seines is that only the opening of the net is supported by a frame. As a result, the operator cannot simply turn the seine on its side to empty the catch because the net would collapse. Rather, the person must use his/her hands in order to remove the catch. An unsupported net is also difficult to clean. The user cannot simply place the seine back into the stream of water with the opening of the seine facing downstream because the net would collapse.

Therefore, there is a need for a seine that a single person can easily operate. There is also a need for a seine in which the net does not easily collapse.

SUMMARY

The advantages of the present invention is that it has an anchor for securing the seine to the bed of a body of water such as a stream. As a result, a single person can easily use the seine. After anchoring the seine to the stream bed, the person can go upstream and herd fish and other aquatic wildlife downstream into the seine. A further advantage is that the net is fully supported. Therefore, a person can easily empty the seine by tipping it on its end or clean out the seine by placing it in the water with the opening facing downstream.

The present invention consists of a mesh receptacle having an intake portion and a collection portion. A frame is connected to the mesh receptacle, and an anchor is connected to the frame. The anchor is capable of securing the seine to the bed of a body of water.

These and other advantages and features that characterize the present invention are pointed out with particularity in the claims annexed hereto and forming a further part hereto. However, for a better understanding of the invention, its advantages, and objects obtained by its use, reference should be made to the drawing which forms a further part hereto, and to the accompanying descriptive matter, which illustrates and describes a preferred embodiment of the present invention.

DETAILED DESCRIPTION OF THE DRAWING

DETAILED DESCRIPTION

Figure 1:
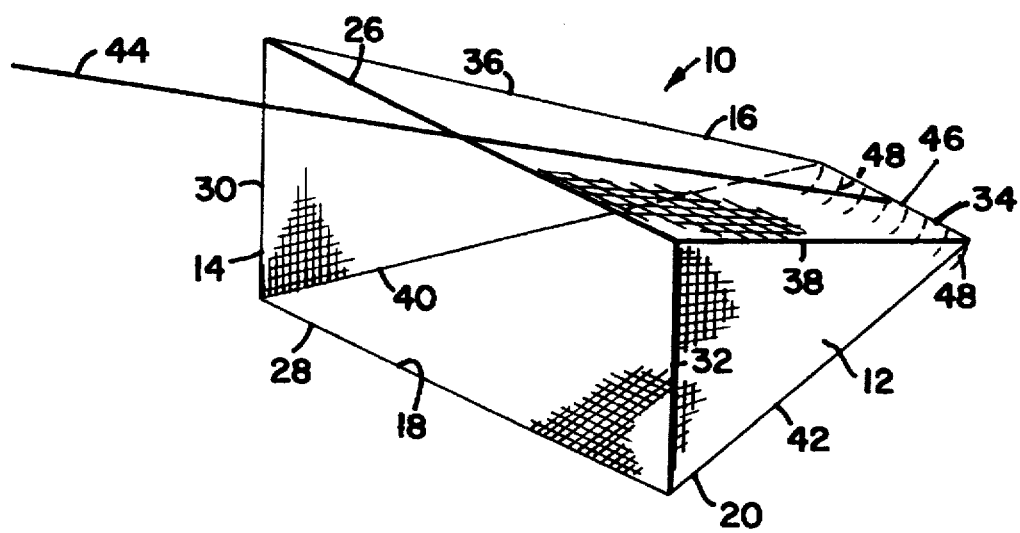
FIG. 1 is a perspective view showing an embodiment of the present invention.

The invention initially will be described in general terms. The preferred embodiment of the invention will then be described in detail with reference to the drawing, wherein like reference numerals represent like parts and assemblies throughout the several views. Reference to the preferred embodiment does not limit the scope of the invention, which is limited only by the scope of the claims.

The present invention relates generally to a seine that can be anchored to the bed of a body of water such a stream. Thus, a single person can easily operate the seine by anchoring it to the stream bed. The person is then free to go up stream and kick up the bottom of the stream and herd the aquatic wildlife into the seine. After the seine is full, the person simply pulls it from the water and tilts it in order to dump the catch into a container such as a basket, aerator, or the like. Although the invention is described for use in a stream, one skilled in the art will realize that it can be used in all different kinds of bodies of water.

Referring now to FIG. 1, the preferred embodiment of the present invention will be described in detail. The present invention is a seine, generally shown as 10, having a mesh receptacle 12. Mesh receptacle 12 has an intake portion 14 and a collection portion 16. Intake portion 14 has an opening 18. Mesh receptacle 12 can be made from a cloth fiber net, metal screen, or other appropriate material. The size of the mesh can vary depending on the size of the aquatic wildlife that the user desires to catch.

Mesh receptacle 12 is supported by frame 20, which has upper and lower horizontal bars 26 and 28, respectively, and trailing edge bar 34. The upper and lower horizontal bars 26 and 28, respectively, are connected by first and second vertical bars 30 and 32, respectively. Intermediate bars 36 and 38 connect the upper horizontal bar 26 to the trailing edge bar 34. Intermediate bars 40 and 42 connect the lower horizontal bar 28 to trailing edge bar 34. A handle 44 is operably connected to the frame 20 and extends from the trailing edge bar 34, across the upper horizontal bar 26, and then projects outward.

The mesh receptacle 12 can be attached to frame 20 in several ways. If the mesh receptacle 12 is a metal screen, it can be either welded or fastened to the frame 20. If the receptacle is merely fastened by means such as screws, it can be easily removed and replaced with an alternative screen. If the mesh receptacle is a cloth fiber net, it can be either permanently sewn to the frame or attached with ties. If ties are used, the cloth fiber net can be easily replaced.

Additionally, the mesh receptacle can be formed from a combination of panels, not shown. For example, an upper panel that is attached between intermediate bar 36, intermediate bar 38, upper horizontal bar 26, and trailing edge bar 34 can be a metal screen. A side panel that extends between intermediate bar 38, intermediate bar 42, and second vertical bar 32 can be made from an alternative material such as a cloth fiber net.

An anchor 46 is connected to the trailing edge bar 34 of the frame 20 and includes a plurality of prongs 48 that project downward. The prongs 48 are preferably between approximately two inches and approximately three inches. One skilled in the art will realize that the handle 44 and anchor 46 can be made from a thatching rake that is operably connected to frame 20. The anchor 46 also can be connected to the frame 20 at other locations. Additionally, other types of anchors can be used such as a grapnel or mushroom anchor.

Figure 2:
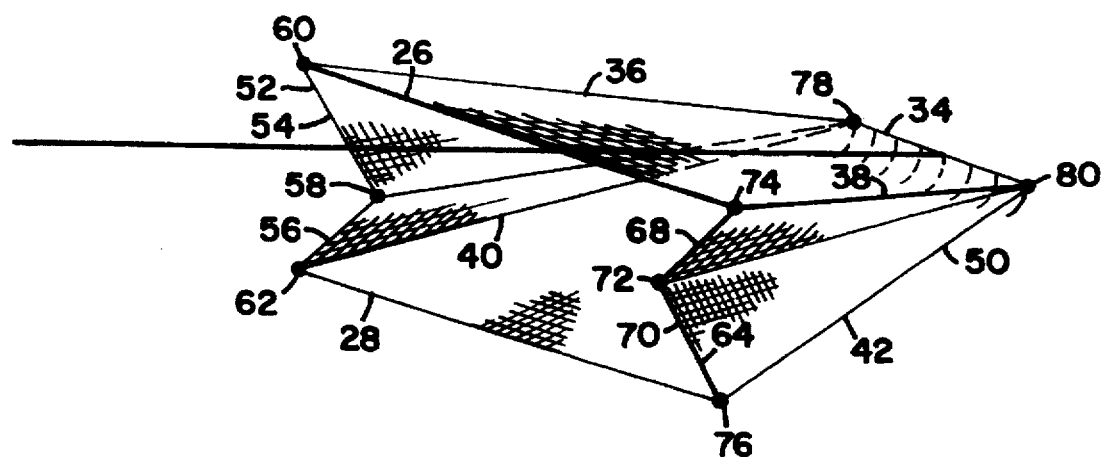
FIG. 2 is a perspective view of an alternative embodiment the seine shown on FIG. 1, the alternative embodiment having a foldable frame, the figure showing the frame partially folded.

FIG. 2 shows an alternative embodiment of the present invention, which includes a folding frame 50. The advantage of this embodiment is that the frame folds substantially flat for ease of storage. In this embodiment, the first vertical bar 52 has upper and lower positions 54 and 56, respectively, connected to a hinge 58. Additionally, the upper portion 54 is connected to the upper horizontal bar 26 by a hinge 60 and the lower portion 56 is connected to the lower horizontal bar 28 by a hinge 62. The second vertical bar 64 is virtually identical to the first vertical bar 52 and has upper portion 68, lower portion 70, and hinges 72, 74, and 76.

In a another alternative embodiment, not shown, upper and lower portions 54 and 56 of first vertical bar 52 are joined by telecoping them together. The upper and lower portions 54 and 56 can be separated for storage in a similar manner. In this embodiment, hinge 58 is not required. Upper and lower portions 68 and 70 of second vertical bar 64 are operably connected in a similar manner thus eliminating the need for hinge 72.

In both alternative embodiments, intermediate bar 40 has one end connected to trailing edge bar 34 by hinge 78 and an opposite end connected to lower horizontal bar 28. Similarly, intermediate bar 42 has one end connected to trailing edge bar 34 by hinge 80 and an opposite end connected to lower vertical bar 28.

The folding frame 50 is folded flat when storing the seine. More specifically, lower horizontal bar 28 moves toward upper horizontal bar 26, which causes the hinges 58 and 72 to move towards one another and hence both the first vertical bar 52 and second vertical bar 64 to fold in half. Additionally, intermediate bar 40 pivots around hinge 78 and intermediate bar 42 pivots around hinge 80. When in the folded position for storage, upper portion 54 and lower portion 56 are approximately parallel to and adjacent with each other and with upper horizontal bar 26 and lower horizontal bar 28. Similarly, upper portion 68 and lower portion 70 are approximately adjacent to and parallel with each other and with upper horizontal bar 26 and lower horizontal bar 28.

Additionally, the mesh receptacle in the alternative embodiments is preferably made from a cloth fiber net or some other pliable material that can collapse with folding frame 50. However, a metal screen that is hinged can also be used with the first alternative embodiment shown in FIG. 2.

In use, a person will place the seine 10 in a body of water such as a stream. The seine is oriented so that the intake portion 14 faces upstream and water will flow into the opening 18 and then through the collection portion 16. After the seine 10 is properly oriented, the person can anchor it by pressing the prongs 48 into the stream bed. Anchoring the seine 10 is easily accomplished by stepping on trailing edge bar 34. The user can then walk up stream and stir up the stream bed and herd the desired aquatic wildlife downstream into the seine 10.

The user can lift the seine 10 from the stream after it is filled with the catch. In order to empty it, he/she can tilt the seine 10 on its edge and pour the catch into a basket, aerator, or other container. The frame 20 holds the mesh receptacle open so that none of the catch will get trapped.

In order to clean the seine after use, the operator can place the seine 10 back into the stream so that the intake portion 14 is facing downstream. In this position, the water flows through the collection portion 16 and then out of the opening 18 and carries any unwanted material out of the mesh receptacle 12.

While the invention has been described in conjunction with a specific embodiment thereof, it is evident that different alternatives, modifications, and variations will be apparent to those skilled in the art in view of the foregoing description. Accordingly, the invention is not limited to these embodiments or the use of elements having specific configurations and shapes as presented herein.

The invention that I claim is:

1. A seine for collecting bait from a body of water, the body of water having a bed, the seine comprising:
   (a) a mesh receptacle having an intake portion and a collection portion;
   (b) a frame operably connected to the mesh receptacle; and
   (c) an anchor having a plurality of prongs operably connected to the frame, at a position adjacent to the collection portion and removed from the intake portion, the anchor being configured to secure the seine to the bed of the body of water.

2. The seine of claim 1 wherein the frame has a leading edge for holding the intake portion of the mesh receptacle in a generally open state and a main portion for holding the collection portion in a generally open state.

3. The seine of claim 2 wherein the mesh receptacle is a net.

4. The seine of claim 2 wherein the mesh receptacle is a screen.

5. A seine for collecting aquatic wildlife from a body of water, the body of water having a bed, the seine comprising:
   (a) a mesh receptacle having an intake portion and a collection portion;
   (b) a frame operably connected to the mesh receptacle, the frame having a first portion for holding the intake portion of the mesh receptacle in a receiving state, and a second portion for holding the collection portion of the mesh receptacle in a receiving state, wherein the first portion of the frame has upper and lower horizontal bars and first and second vertical bars, and the first and second vertical bars are substantially vertical when the intake portion of the mesh receptacle is oriented to receive wildlife; and
   (c) an anchor operably connected to the frame, the anchor having prongs configured to penetrate into the bed of the body of water, the prongs oriented such that the intake portion of the mesh receptacle is oriented to receive aquatic wildlife when the prongs penetrate into the bed of the body of water.

6. The seine of claim 5, wherein the seine has a collapsed state, further wherein the first and second vertical bars are hinged so that the frame can shift between the receiving state and the collapsed state.

7. A seine for collecting bait from a body of water, the body of water having a bed, the seine comprising:

(a) a mesh receptacle having an open end and a closed end;

(b) a frame operably connected to the mesh receptacle and extending between the open and closed ends, wherein the frame is configured to collapse and reopen; and (c) an anchor operably connected to the frame, the anchor being configured to secure the seine to the bed of the body of water.

8. A seine for collecting bait from a body of water, the body of water having a bed, the seine comprising:

(a) a mesh receptacle having an intake portion and a collection portion;

(b) a frame operably connected to the mesh receptacle; and (c) an anchor operably connected to the frame, the anchor being formed of a thatching rake having an elongate handle, said anchor configured to secure the seine to the bed of the body of water.

9. A seine for collecting bait from a body of water, the body of water having a bed, the seine comprising:

(a) a mesh receptacle having an intake portion and a collection portion;

(b) a frame operably connected to the mesh receptacle, the frame having a first portion for holding the intake portion of the mesh receptacle in a receiving state, and a second portion for holding the collection portion of the mesh receptacle in a receiving state, wherein the frame includes a trailing edge bar; and (c) an anchor operably connected to the trailing edge bar, the anchor having prongs configured to penetrate into the bed of the body of water, the prongs oriented such that the intake portion of the mesh receptacle is oriented to receive bait when the prongs penetrate into the bed of the body of water.

\* \* \* \* \*

UNITED STATES PATENT AND TRADEMARK OFFICE
CERTIFICATE OF CORRECTION

PATENT NO. : 5,615,510

DATED : April 1, 1997

INVENTOR(S) : Eric C. Anderson

It is certified that error appears in the above-indentified patent and that said Letters Patent is hereby corrected as shown below:

```
Claim 1, column 4, line 9 "removed from" should read
--rearward of--.
```

Signed and Sealed this

Twenty-third Day of September, 1997

Attest:

BRUCE LEHMAN

Attesting Officer

Commissioner of Patents and Trademarks